United States Patent
Kurby et al.

(10) Patent No.: US 9,766,338 B2
(45) Date of Patent: Sep. 19, 2017

(54) GNSS COOPERATIVE RECEIVER SYSTEM

(71) Applicant: iPosi, Inc., Denver, CO (US)

(72) Inventors: Christopher Neil Kurby, Streamwood, IL (US); Richard M. Lee, Denver, CO (US); Eric Derbez, Vancouver (CA)

(73) Assignee: iPosi, Inc., Denver, CO (US)

( * ) Notice: Subject to any disclaimer, the term of this patent is extended or adjusted under 35 U.S.C. 154(b) by 0 days.

(21) Appl. No.: 14/635,873

(22) Filed: Mar. 2, 2015

(65) Prior Publication Data

US 2016/0259060 A1  Sep. 8, 2016

(51) Int. Cl.
| | |
|---|---|
| *G01S 19/05* | (2010.01) |
| *G01S 5/02* | (2010.01) |
| *G01S 19/06* | (2010.01) |
| *G01S 5/14* | (2006.01) |
| *G01S 19/46* | (2010.01) |
| *G01S 19/48* | (2010.01) |
| *G01S 19/51* | (2010.01) |

(52) U.S. Cl.
CPC ............ *G01S 19/05* (2013.01); *G01S 5/0289* (2013.01); *G01S 19/06* (2013.01); *G01S 5/145* (2013.01); *G01S 19/46* (2013.01); *G01S 19/48* (2013.01); *G01S 19/51* (2013.01)

(58) Field of Classification Search
CPC .......... G01S 19/05; G01S 19/44; G01S 19/43; G01S 19/04; G01S 5/0221; G01S 5/0289; G01S 5/145
USPC ..... 342/357.42, 465, 357.26, 357.27, 357.41
See application file for complete search history.

(56) References Cited

U.S. PATENT DOCUMENTS

| | | | |
|---|---|---|---|
| 6,449,558 B1 * | 9/2002 | Small | G01S 5/0289 342/357.31 |
| 7,084,809 B2 * | 8/2006 | Hockley, Jr. | G01S 5/0072 342/357.48 |
| 7,898,472 B2 * | 3/2011 | Zeng | G01S 5/0072 342/357.34 |
| 8,364,166 B2 * | 1/2013 | Soliman | G01S 5/0072 342/378 |
| 8,368,589 B2 * | 2/2013 | Wirola | G01S 19/29 342/357.26 |
| 8,457,657 B2 * | 6/2013 | Aggarwal | H04W 60/00 455/456.2 |
| 8,634,849 B2 * | 1/2014 | Jovicic | G01S 5/0009 455/456.1 |
| 9,213,081 B2 * | 12/2015 | Tarlow | G01S 5/0257 |
| 9,213,083 B1 * | 12/2015 | Carter | G01S 5/10 |

(Continued)

*Primary Examiner* — Chuong P Nguyen
(74) *Attorney, Agent, or Firm* — Marsh Fischmann & Breyfogle LLP

(57) ABSTRACT

A GNSS cooperative receiver system that can be utilized when one or more GNSS receivers is in a compromised position where it cannot receive direct signals from a sufficient number of GNSS satellites. This may in the interior of an office building or multi-dwelling unit, which may be in the vicinity of other tall buildings. The receivers determine their relative positions from one of various ranging techniques, and then with this relative position information, pseudoranges, and correlation values from the various GNSS receivers, the best GNSS solution can be determined for the group of cooperative receivers. This could include two or more receivers in a group. There also related techniques for one receiver to be a designated, remote anchor for other GNSS receivers that need such assistance.

18 Claims, 11 Drawing Sheets

(56) References Cited

U.S. PATENT DOCUMENTS

| | | | |
|---|---|---|---|
| 9,485,745 B2* | 11/2016 | Kurby | H04W 56/00 |
| 2007/0085734 A1* | 4/2007 | Whitehead | G01S 19/07 |
| | | | 342/357.24 |
| 2008/0284645 A1* | 11/2008 | Terada | G01S 19/04 |
| | | | 342/357.34 |
| 2009/0303116 A1 | 12/2009 | Wirola et al. | |
| 2012/0056781 A1 | 3/2012 | Kong et al. | |
| 2012/0172054 A1 | 7/2012 | Waters et al. | |
| 2012/0249368 A1 | 10/2012 | Youssef et al. | |
| 2012/0289243 A1 | 11/2012 | Tarlow et al. | |

* cited by examiner

GNSS COOPERATIVE RECEIVER SYSTEM

GLOSSARY

BOC Binary Offset Code used in the Galileo GNSS system
GNSS global navigation by satellite system
GPS Global Position System
IEEE Institute of Electrical and Electronics Engineers
L1 C/A code GPS signal at 1575.42 MHz
L1C Civilian use signal from GPS
L5C code GPS signal at 1176.45 MHz
LTE Long Term Integration 3GPP
MHz megahertz
PTP Precision Time Protocol
RF radio frequency
Rx receive
SNR signal to noise ratio
SV GNSS space vehicle or satellite
RTK Real Time Kinematics
WGS84 World Geodetic System developed in the 1980s

BACKGROUND

The US Government and the governments of other countries/regions have installed and continue to maintain satellite constellations to provide location determining capability in their respective countries/regions. The Global Positioning System (GPS) is the US version of such Global Navigation Satellite Systems (GNSSs). Throughout this disclosure, the generic term GNSS, the specific term GPS, or the combination GPS/GNSS may be used and such references shall refer to any such system, including GPS, GLONASS (Russian), Galileo (European), Indian Regional Navigation Satellite System (IRNSS), BeiDou-2 (Chinese), or other such comparable system.

Accordingly, many modern electronic and consumer devices include a GNSS receiver that can determine the absolute position of the device (in latitude, longitude, and altitude) via the GNSS system. GNSS receivers determine their position to high precision (within a few meters) by receiving time signals transmitted along a line-of-sight by radio (e.g., RF signals) from each "visible" GNSS satellite. The signals also allow the electronic receivers to calculate the current local time to high precision, which allows for time synchronization.

One problem is that GNSS systems require a direct path (from each satellite used in a location and sync solution) to the GNSS receiver in order to compute an optimum solution. In outdoor environments, where there are no obstacles (e.g., on the open highway) this is easily realized. Further, in some light building structures (e.g., residential houses composed largely of wood) the GNSS signals are (1) only mildly attenuated, so that the received signal strength is above the sensitivity of the GNSS receiver, and (2) have an ideal, direct, and thus un-delayed path from the satellite to the receiver as seen in FIG. 1. In this case the signal rays are undistorted in time; that is, they have the same propagation time as a true line-of-sight (LOS) path and they can be used to provide an accurate location for the receiver.

However, in heavy urban environments where a building may be embedded among a cluster of buildings, a direct signal ray may not exist from all of the satellites. FIG. 2 shows a receiver located at a corner of a floor of a building, the building being in a homogenous cluster of buildings of equal size and spacing for illustration purposes.

In this case the receiver has a direct LOS signal from SV1 on the side with the least obstruction to the satellite. On the side facing SV2, the direct ray is attenuated below the sensitivity of the receiver. There is also a reflected ray from SV2 which necessarily is an elongated ray (because the distance traveled by the ray is greater than the distance between SV2 and the receiver. The elongated ray will introduce an error into the location estimate.

Present technology provides no solution for GNSS location in a cluster of buildings. Rather the locations of points to be located are done via manual and physical survey methods.

It is against this background that the techniques described herein have been developed.

SUMMARY

Disclosed herein is a method for a GNSS receiver to more accurately determine the position of the GNSS receiver, based in part on signals received from one or more GNSS satellites. The method includes determining the distance from a first GNSS receiver to each of one or more other GNSS receivers; each GNSS receiver generating pseudoranges and correlation values associated with one or more GNSS satellites; collecting pseudoranges and correlation values from each of the first GNSS receiver and the one or more other GNSS receivers; and from the pseudoranges, correlation values, and determined distance to each of the one or more other GNSS receivers, generating a best solution for the position of the first GNSS receiver.

The distance determining may be performed cooperatively by the first GNSS receiver and the one or more other GNSS receivers. This may include RF ranging, wired ranging, or other. The distance determining may allow the relative geometry of the GNSS receivers to be determined. The method may further include determining which of the receivers is best able to receive GNSS signals from a first one of the GNSS satellites, may further include determining which of the receivers is best able to receive GNSS signals from a second one of the GNSS satellites, and may further include determining the relative geometry of the GNSS receivers based at least in part on which receiver is best able to receive GNSS signals from a first one of the GNSS satellites.

The method may further include determining the position of each of the one or more other GNSS receivers, in addition to determining the position of the first GNSS receiver. The determining of the positions of the group of cooperative GNSS receivers may include determining the distance between each one of the cooperative GNSS receivers in the group and every other one of the cooperative GNSS receivers in the group.

The determining of the positions of the group of cooperative GNSS receivers may include selecting one of the GNSS receivers to be an anchor receiver; determining the position of each of the cooperative GNSS receivers in the group; determining a residual error from that determining operation; rotating the positions of each of the cooperative GNSS receivers in the group about an axis passing through the position of the anchor receiver and a centroid of the group of GNSS receivers; determining a residual error from that rotated position; comparing the residual errors from the two different sets of positions; and selecting an optimal position based upon the comparison.

The positions of each of the cooperative GNSS receivers in the group may be rotated to multiple positions about the axis and a residual error may be determined for each such multiple position, wherein the comparison is made of the residual errors from each of the multiple positions, and the selection is made based on that comparison. A geodetic system may be used that has the anchor receiver as the origin of the geodetic system. The geodetic system may be defined relative to a plane tangent to a vector from the center of the Earth to the anchor receiver. The geodetic system may use true north as a reference. The geodetic system may use an arbitrary vector as a reference.

Also disclosed is a method for determining the location of a GNSS receiver including determining the vector from a first GNSS receiver to a second GNSS receiver; the first GNSS receiver determining its location from signals from multiple GNSS satellites; and from the location of the first GNSS receiver and from the vector, determining the location of the second GNSS receiver.

Each of the first and second GNSS receivers may have a clock, and wherein the two clocks are synchronized. Each of the first and second GNSS receivers may have a clock, and wherein the two clocks are not synchronized. The first GNSS receiver may be located in the same building as the second GNSS receiver. The first GNSS receiver may be located in a different building from the second GNSS receiver.

DETAILED DESCRIPTION

Figure 1:
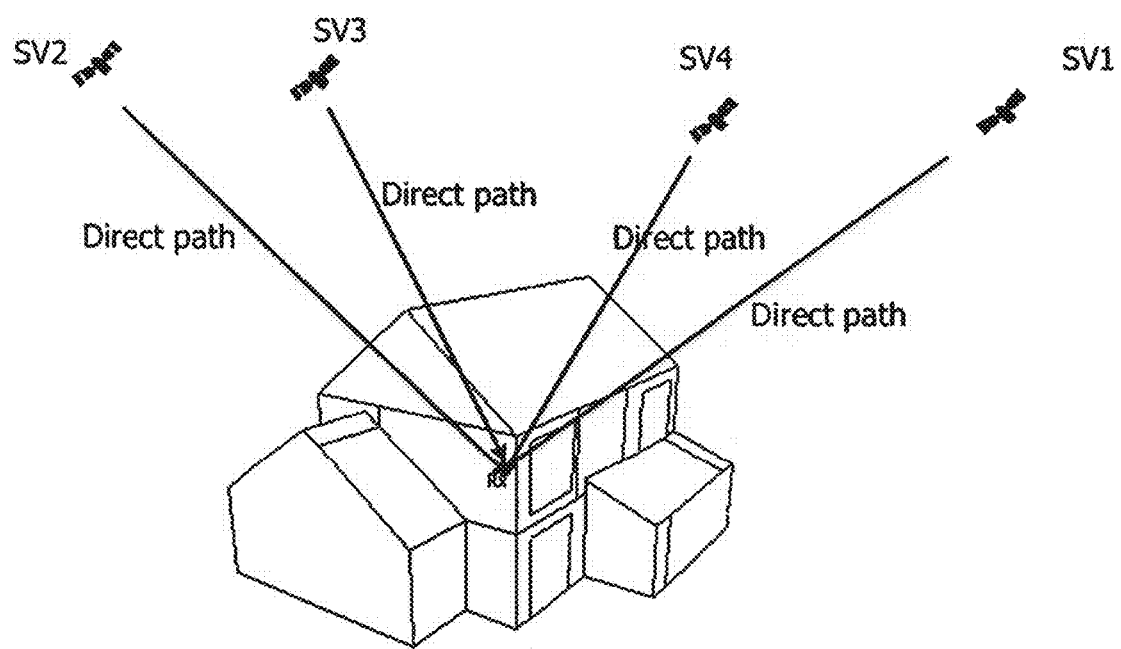
FIG. 1 is an illustration of a residential building with the receiver therein that has only lightly attenuated rays from GN SS satellites.
Figure 2:
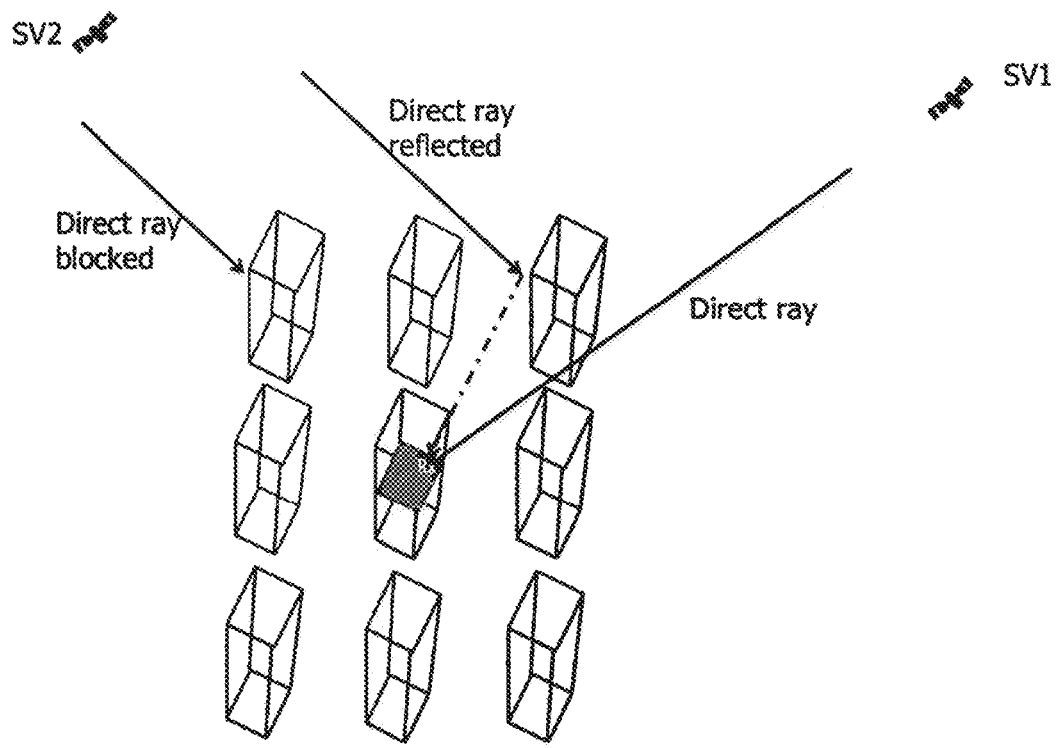
FIG. 2 is an illustration of an urban cluster of buildings that prevent one or more receivers from receiving direct rays from one or more satellites.

While the disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

The solution provided herein to the problems described above is to use a set of GNSS receivers in cooperation with each other. The cooperating receivers first conduct ranging measurements to each other to determine the distance to each other and establish the relative geometry of the cooperating receivers. Then, the cooperating receivers compute pseudoranges and correlation values for each of the GNSS satellites available to them. These pseudoranges/correlation values are sent either to each other or to a central server where they are combined to generate a single solution. This solution is then translated back to each receiver using the known geometry or relationship to each other. The geometry is rotated and optimized to concur with the best GNSS solution of the group.

Figure 15:
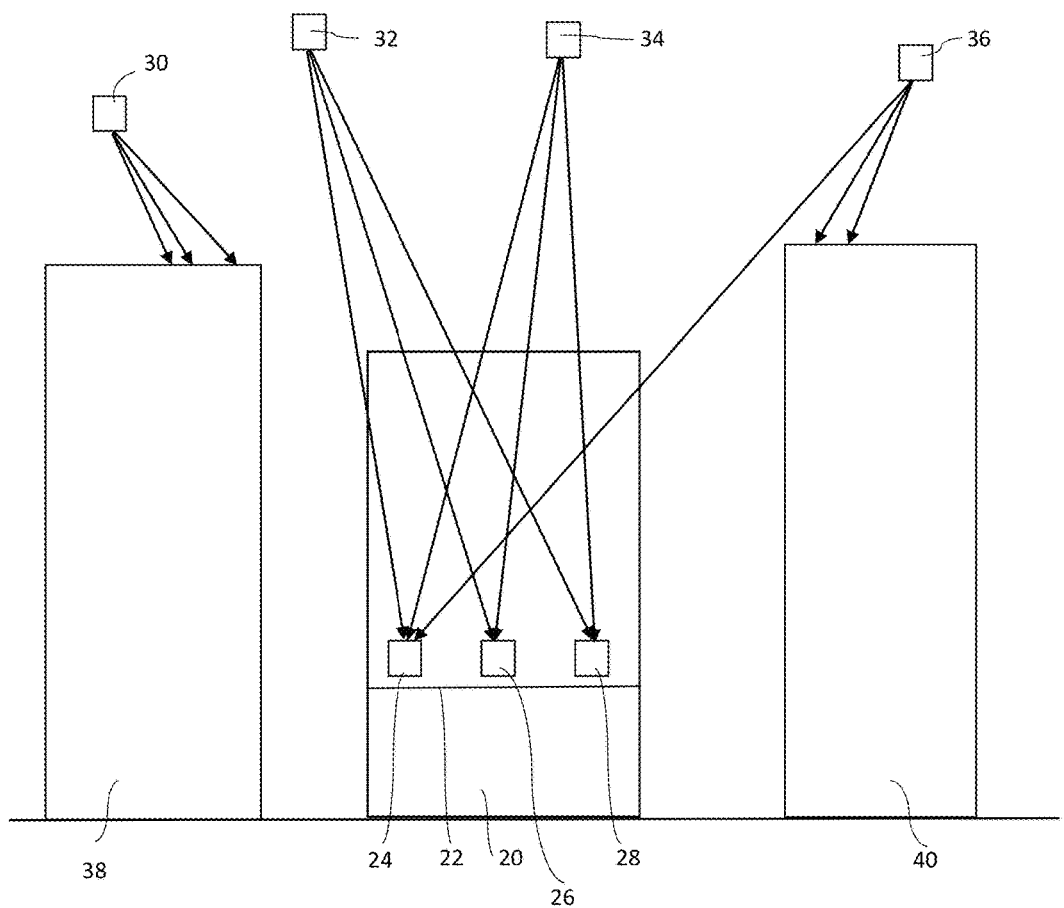
FIG. 15 is a simplified illustration of three receivers located on a floor of a building located proximate to two taller adjacent buildings, and further showing issues related to the reception of signals from multiple GNSS satellites.

FIG. 15 provides a simplified illustration of a geometry that may exist in a building 20. Located on a particular floor 22 of the building 20 are GNSS receivers 24, 26, and 28. Multiple GNSS satellites or space vehicles may be located in the sky above the building 20. These may include satellite 30, satellite 32, satellite 34, and satellite 36. However, since buildings 38 and 40 are located proximate to building 20, some of the receivers 24, 26, and 28 on floor 22 of building 20 are in the shadow of those adjacent buildings 38 and 40 with respect to certain ones of the satellites. For example, the direct path from satellite 32 to each of the receivers 24, 26, and 28 would pass through building 38 (so that the direct signal that is received by the receivers 24, 26, and 28 may be so attenuated as to be below the sensitivity level of the receivers). On the other hand, the direct rays from satellite 32 are not blocked by either building 38 or 40 and only pass through a portion of the structure of building 22 before arriving at receivers 24, 26, and 28. Note that the direct ray from satellite 32 to receiver 24 only passes through a small portion of the building 20, so this may be a relatively strong signal received by receiver 24. Similarly, the direct ray from satellite 34 to each of receivers 24, 26, and 28 does not pass through either building 38 or 40. Lastly, the direct rays from satellite 36 to receivers 26 and 28 pass through and are largely attenuated by building 40 and so they may be below the sensitivity level of receivers 26 and 28. However, the direct ray from satellite 36 two receiver 24 does not pass through buildings 38 or 40 and is likely to be above the sensitivity level of receiver 24. Note that this is a simplified diagram that leaves out multiple real-world aspects. For example, there may be more GNSS satellites that are visible to one or more of the receivers. Typically, there are also reflected rays off adjacent buildings that are received by the receivers.

Figure 16:
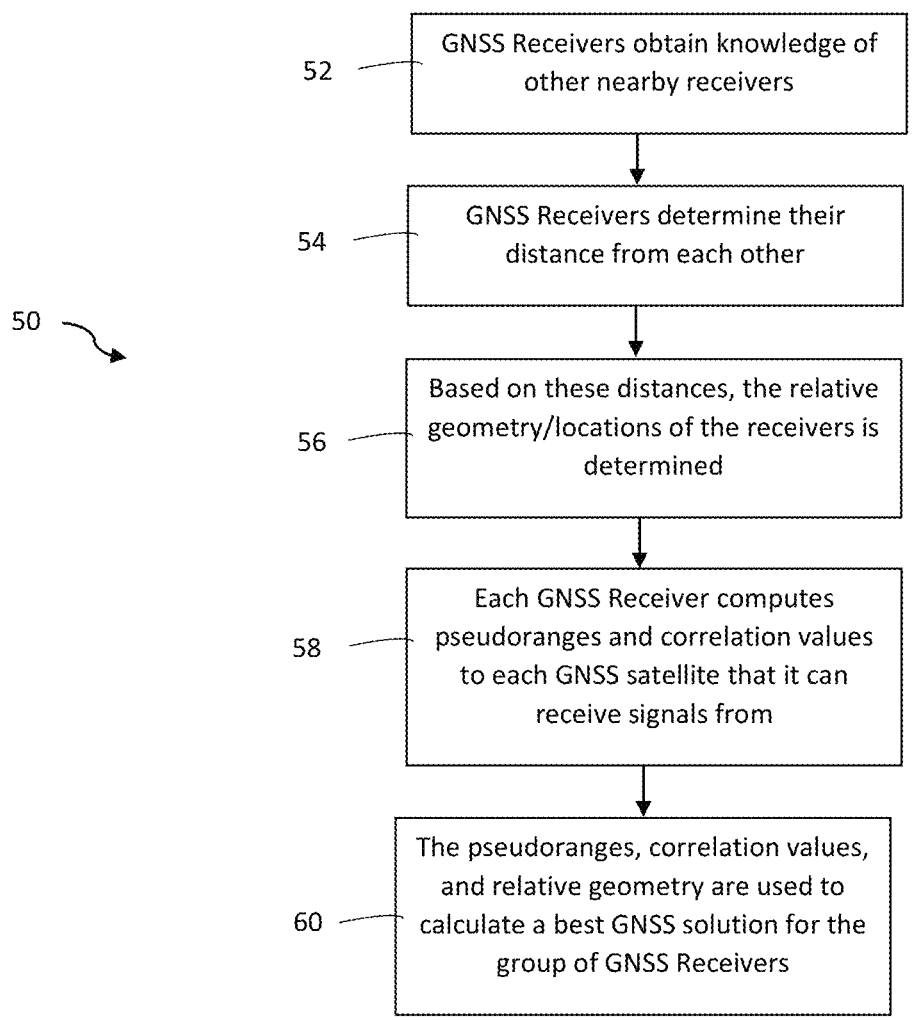
FIG. 16 is a flow chart of certain techniques taught herein.

A high-level flowchart 50 of the techniques taught herein is provided in FIG. 16. GNSS receivers are able to obtain (52) knowledge of other nearby receivers. This may include receivers located on the same floor of a building or it may possibly include one or more receivers located on adjacent floor of a building. The GNSS receivers are able to determine (54) their distance from each other. Details on how this can be done is provided below. Based on these distances, the relative geometry/locations of the receivers is determined (56). This determination can be made by one or more of the receivers individually, as a group, or by a separate processor in communication with one or more of the receivers. Each GNSS receiver is able to compute (58) pseudoranges and correlation values to each GNSS satellite that it can receive signals from. The pseudoranges, correlation values, and relative geometry are used to calculate (60) a best GNSS solution for the group of GNSS receivers. As with operation 56 described above, this operation 60 can be performed by one or more of the receivers individually, as a group, or by a separate processor in communication with one or more of the receivers.

Figure 3:
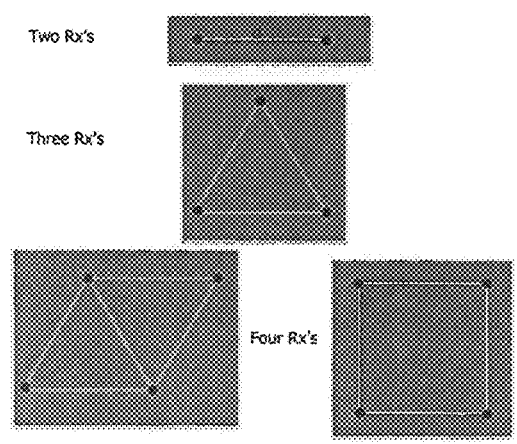
FIG. 3 is an example of some small cell geometries for groups of two receivers, groups of three receivers, and groups of four receivers.

The Cooperative Receiver architecture includes the GNSS cooperative receivers being arranged on any floor of a building in a way to provide small cell coverage for users on the floor. In this way, they form a geometry on the floor described by their separation from each other. Three prevalent geometries (as shown in FIG. 3) are 2 GNSS Receivers in a line, 3 GNSS Receivers in a triangle, and 4 GNSS receivers in a set of triangles or in a square (or other quadrilateral) as indicated below. The shaded area is the floor of the building on which the receivers are located. These are shown as symmetrical layouts or geometries but this is not necessary. Further, although the receivers are described as being on the same floor, the techniques discussed herein could be applied when the receivers are on different floors within a reasonable distance of each other.

Figure 4:
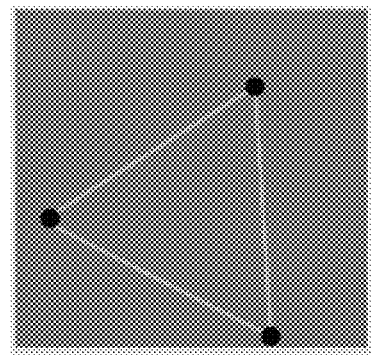
FIG. 4 is an example of three GNSS receivers with a known relative relationship but unknown true positions.

Next, the distance from cell to cell is measured and the geometry determined. For example, in the case of 3 receivers, if the distance from each receiver is known, then it is a routine matter to generate the triangle that describes the receiver relationships. However, the exact orientation and positions within the building will not be known until the GNSS locations are calculated. The orientation problem is indicated in FIG. 4 for 3 GNSS Receivers with correct relative spacing but unknown true position.

The distance from receiver to receiver can be determined in many ways. Three are described below. The distance from receiver to receiver can be measured with wireless technology. This could be Wi-Fi ranging from receiver to receiver as is done today for mobile location, it can also be an LTE signal or other RF signal. The distance can be measured by the propagation time over a wired link receiver to receiver such as the Ethernet link receiver to receiver using IEEE 1588v2 (PTP) or some other protocol. This will be less accurate than wireless since there will be unknown cable lengths associated with the wiring in walls, floors and the like. It can be a predetermined placement pattern such as: all receivers across all floors have the same geometry, and measurements are only needed once or not at all.

Figure 5:
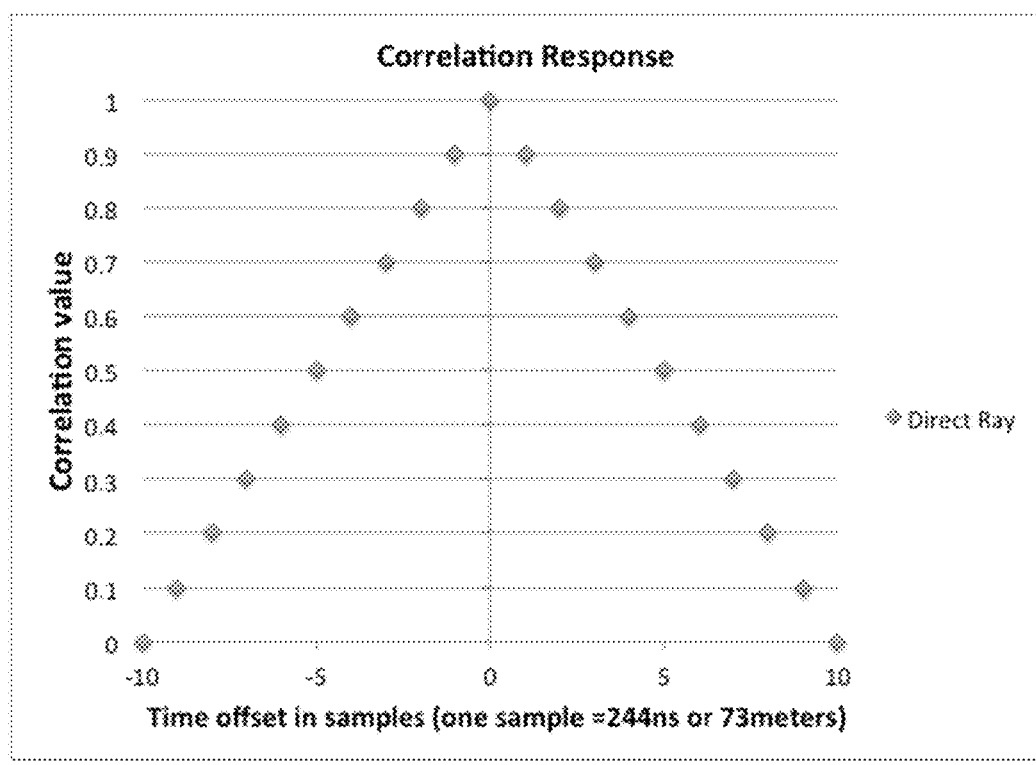
FIG. 5 is a graph of noiseless correct direct ray correlation.

Next, GNSS measurements are performed from each GNSS receiver to each satellite in view. The measurements result in candidate correlation time offset values and Doppler bins. In the ideal case of low noise and no reflections or diffractions, the correlation response in the ideal Doppler bin will look triangular with the peak value defining the correct time offset at time offset zero from true time as seen in FIG. 5.

The GNSS receiver will pass the top correlation values and time offsets for the top five to ten values across sample time and Doppler offsets, in this case offsets −2 samples to +2 samples in the ideal Doppler bin, to the GNSS computation engine and/or other GNSS receivers to cooperate in the GNSS solution.

Figure 6:
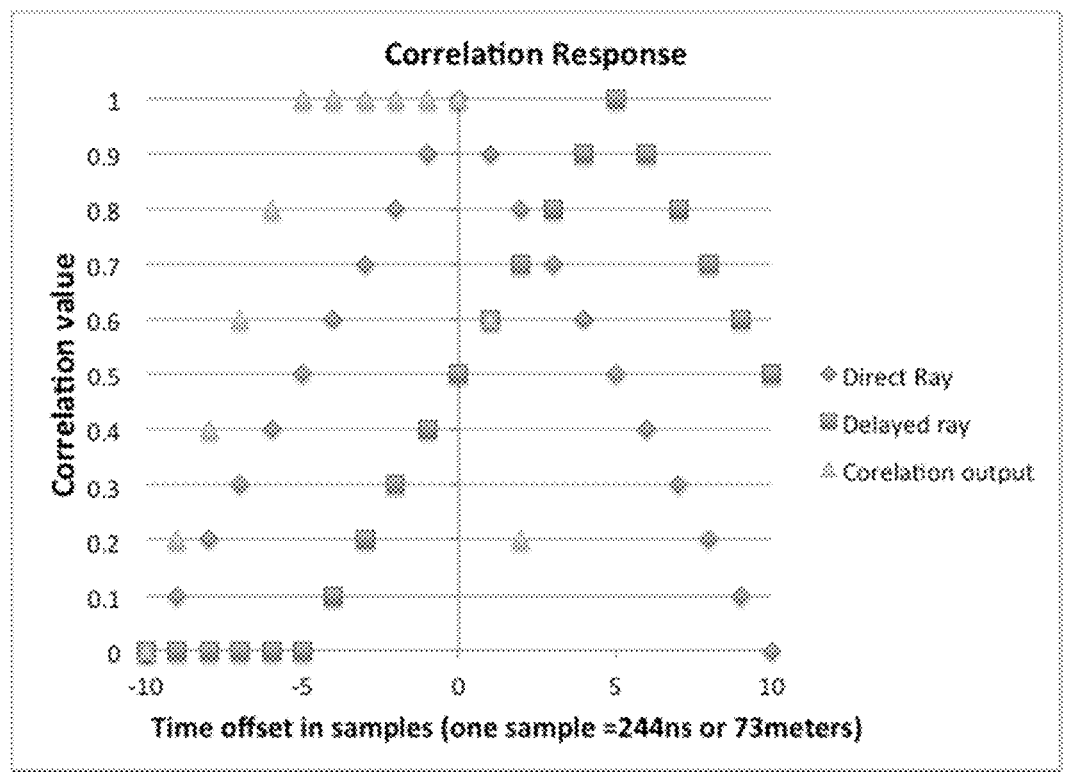
FIG. 6 is a graph of actual noiseless correlation output with direct and delayed rays.

In the case of a delayed ray due to reflection or diffraction, a second response will add to the correct response. FIG. 6 shows the direct or correct ray response in diamonds and the delayed response in squares, all in the ideal Doppler bin for simplicity. Note that the correlator cannot compute these responses separately, rather a composite correlation output is generated, as seen in the triangles. This example is generated with the delayed ray out of phase with the direct ray which means the responses from the rays are subtracted from each other, rather than added together. This makes it appear that the correct correlation value is earlier than the true one at time 0 sample in FIG. 6. The composite response (the triangles) has no clear correct peak value. It certainly is not the first peak at time equal to −5, although one is tempted to declare that the correct peak, because the others are delayed, but that is wrong in this case.

Figure 7:
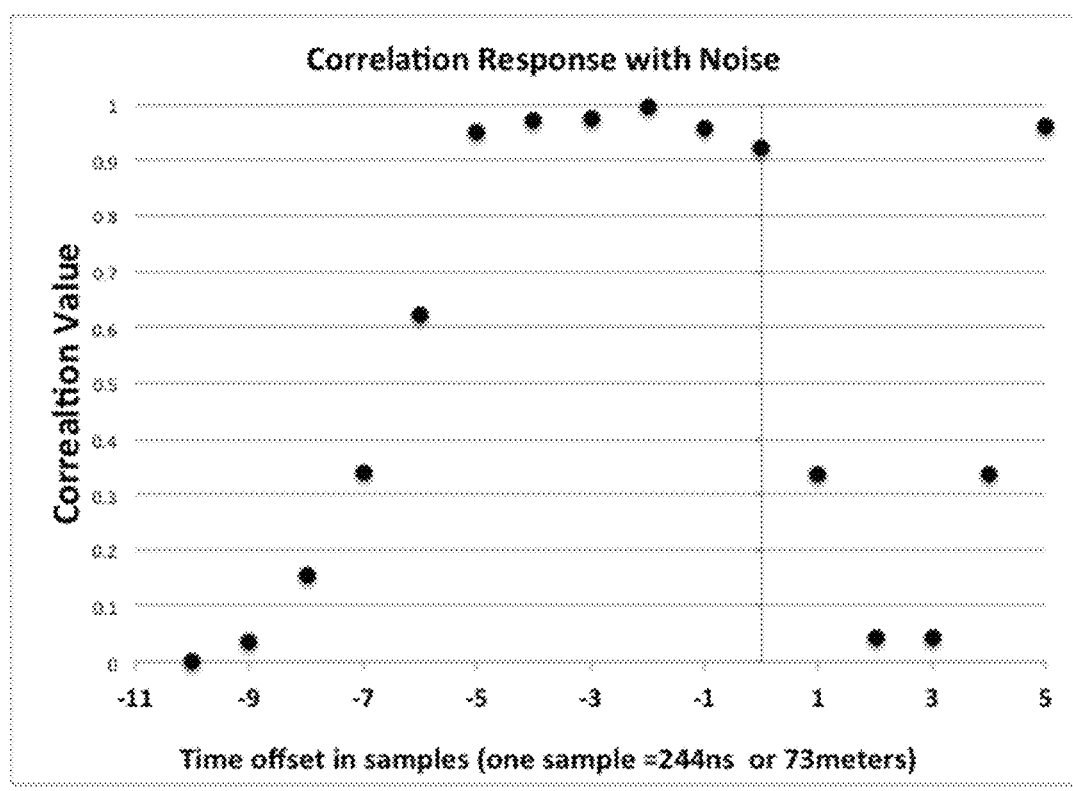
FIG. 7 is a graph of actual with noise correlation output with direct and delayed rays.

Next, the output correlation values are generated for the direct and delayed rays, but with noise added, as shown in FIG. 7. With noise added, it is clear that the correct correlation value at zero offset can have a lower correlation value than the largest at −2, an incorrect one. To allow for a correct decision all six top values and offsets are passed to the cooperative GNSS engine. Then the GNSS engine, using the responses from the other receivers in cooperation, generates an optimum result and the correct offset value is identified and the correct location solution generated.

In addition to GPS, this also applies to other GNSS constellations and signals such as the European Galileo GNSS E5A BOC code and the GPS L1C. This code is a method which has the characteristic of shifting the spectrum off center frequency by plus or minus a 'determined amount,' resulting in a dual spectrum peak symmetrical around the center frequency. It still results in a single optimum time correlation value. Of course, code in this case refers to the pattern modulating the carrier frequency (similar to Gold Codes used in GPS).

For the GNSS solution, it is assumed that the receivers can range each other's distance (pairwise at least on the same floor as indicated above). The ultimate goal is to relate the measurements of non-anchor receivers to those of the anchor; this is equivalent to offsetting the true position of the satellite whence the non-anchor measurement was made by the vector between from the non-anchor receiver to the anchor. If we had two receivers: A (anchor) and B on the same floor, and we knew the distance between A & B, then we know the exact location of B relative to A up to an overall rotation about A on the ground.

Figure 8:
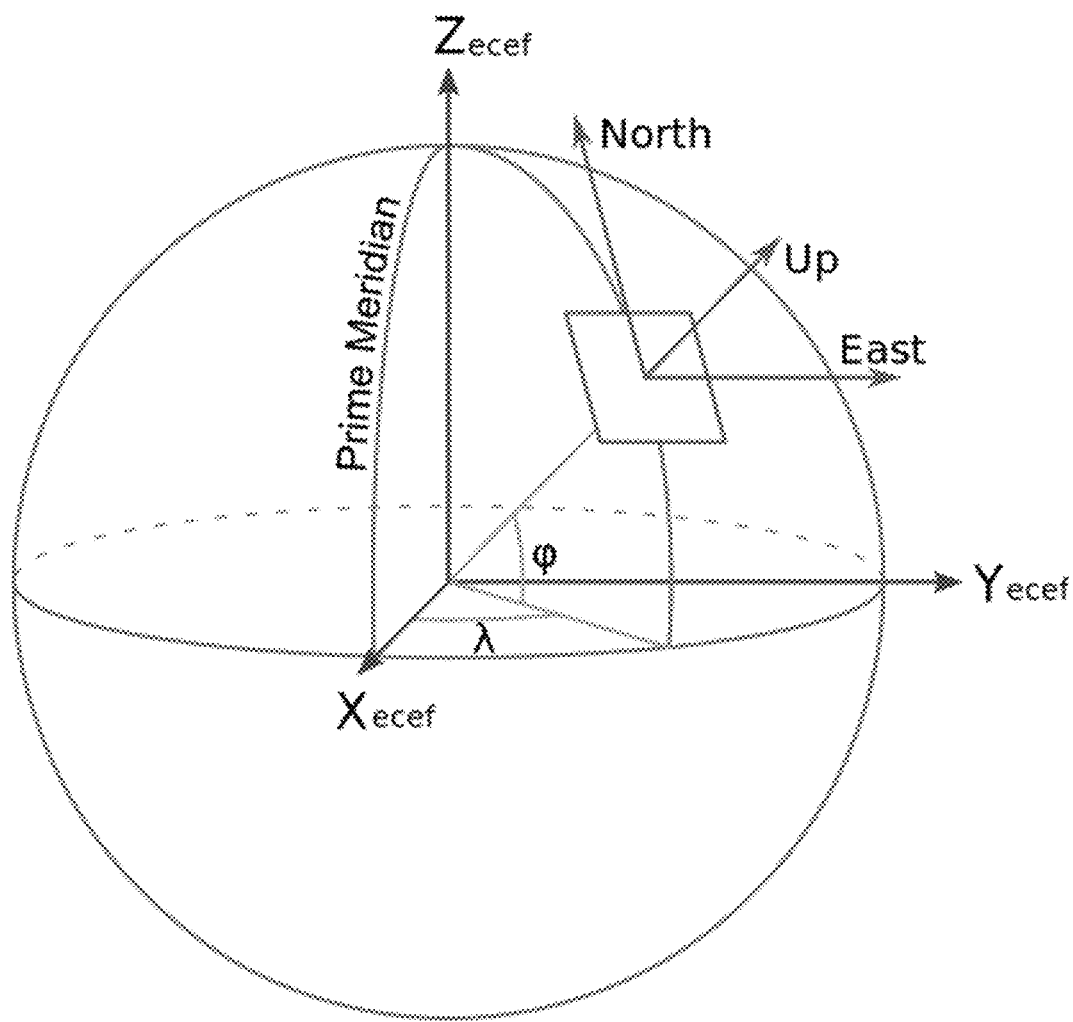
FIG. 8 is an illustration of the ENU coordinate system.

To compute the ENU coordinates (shown in FIG. 8), the geodetic normal U to an (a priori) anchor position P is computed. Then, the north pointing vector is computed (N=Z−projU Z), and the East pointing vector is computed (E=N×U). By calculating the transformation between local coordinates in the local East, North, Up (ENU) frame, one can shift the satellite positions (in the WGS84) frame so that the measurements from B will be consistent with their having been received by receiver A. This linear transformation can be calculated using an a priori position of A which need only be good to about 1 km.

To discover the correct rotation angle, one can apply different rotation hypotheses (offline on a server) and for each hypothesis, one can look at the residuals (e.g., see U.S. patent application Ser. No. 14/285,770, entitled JOINT PROCESSING OF GNSS PSEUDORANGE SIGNALS, the entire contents of that application being incorporated by reference herein). The joint processing of the data from these receivers will produce a position P and a set of biases. For each measurement, there will be a residual error to the best fitting Puser and bias (Bias). For a given satellite, the residual R, is given by $$R = \|P\text{user} - P\text{sat}\| - (\rho + \text{Bias}) \quad (1)$$

where it assumed the pseudorange ρ has been adjusted for satellite clock and drift, atmospheric effects, and earth rotation effects.

The root-mean-square of these residuals will yield a goodness-of-fit; the rotation angle with the lowest residual error will yield the correct orientation on the local plane. Note that Psat for satellites used by receiver B will be modified by the vector offset in WGS84 coordinates corresponding to the angle and distance of B to A in the ENU frame.

Figure 9:
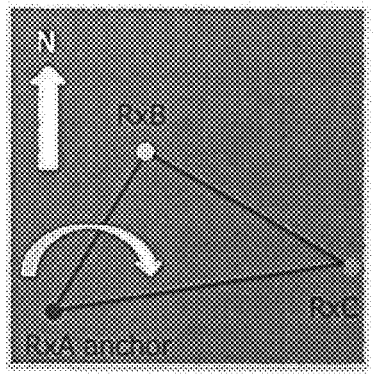
FIG. 9 is a first possible configuration for receiver A, receiver B, and receiver C.
Figure 10:
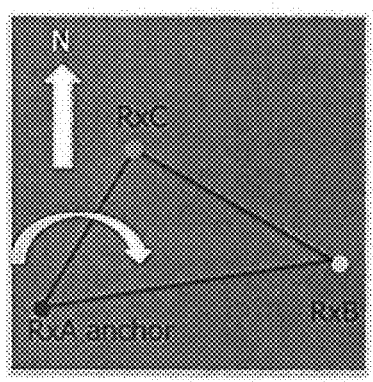
FIG. 10 is an alternate configuration to that of FIG. 9, with the positions for receiver B and receiver C swapped.

If there are 3 receivers: A (anchor), B, and C, whose pairwise separations are known, then their displacements are known up to a rotation about A on the plane with two scenarios:

That is, for a given rotation angle about A, there is a possible flipped scenario for the receivers' positions (as shown in FIGS. 9 and 10). By performing the same procedure as in the two receiver case, one can relate all the measurement to the anchor A's frame and by performing (offline on a server) the test on residual of different rotation hypotheses, one can find the correct orientation of receivers B and C relative to A.

The case with 4 or more receivers can be reduced to that of 3 by picking subsets of 3 receivers as above. Note also that in the above process it is NOT assumed that the receivers' clocks are synchronized. Once the anchor's WGS84 position is computed, the rest of the receivers' positions in WGS84 can also be computed by applying the known ENU deltas mapped back into the WGS84 frame.

There are multiple variations on these techniques:

1) This can also be done without identifying true north initially. Rather, an arbitrary vector in the plane is chosen and then the rotations are done with respect to this arbitrary zero degree reference. This is of course necessary when in the vicinity of the kernel of the transformation—namely near the north or south poles.

Figure 11:
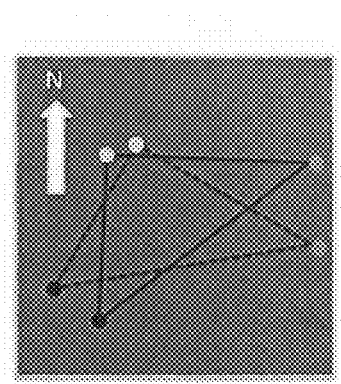
FIG. 11 is an illustration of the final positions determined with the best GNSS solution using a centroid as an anchor.

2) Rather than select a single Rx as the anchor, a geometry orientation is assumed using the triangular configuration as above (or some other suitable configuration). Then each Rx's correlation values/pseudoranges are translated according to the configuration to the geometric center (the centroid) and the location is calculated and the location and residual error is stored. The configuration is then rotated x degrees around the assumed center and the location and residuals are calculated again. This is repeated for 360 degrees. The best fit is determined from the lowest residual. After the rotation yielding the smallest residuals is are found, the final locations are indicated in FIG. 11 where the dotted line triangle are the initial positions and the solid line gives the final position and orientation of the receivers after rotating about the centroid.

3) An alternate way to determine initial orientation that may be available is to arrange the receivers according to signals received. If a receiver has high signal levels from satellites on the East then a good estimate of the position of the receiver is on the East side of a building. Similarly if a receiver gets a high signal level from the Southwest then the receiver should be positioned towards the SW and so on. From these satellite directions to the receivers, the orientation of the receivers can be estimated.

Figure 12:
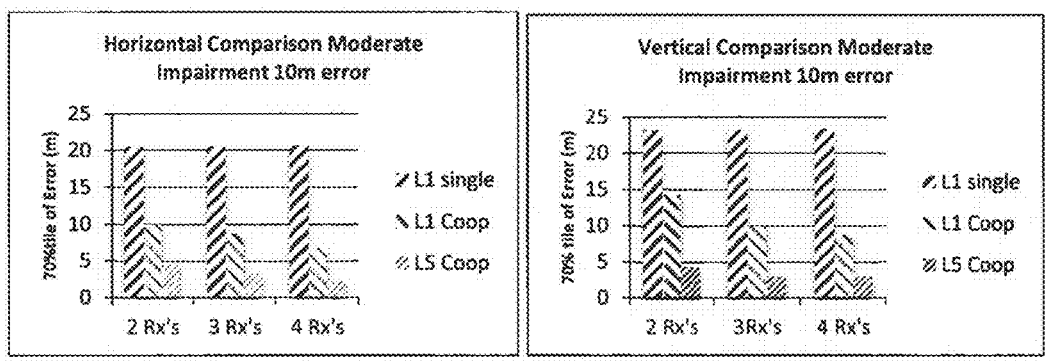
FIG. 12 are graphs of horizontal and vertical error comparison versus the number of receivers, and showing a non-cooperating situation, and cooperating situations for two different kinds of GNSS signals.

Cooperative receiver calculations were conducted for several receiver configurations. These included two receivers in a line, three receivers in a triangle, and four receivers in a square all with 30 meters distance to their adjacent neighbor. In the case of the square, the neighbor diagonally opposite was 1.414*30 meters away. The simulations were conducted with each receiver measuring correlation values from four SVs; three of them had the correct time offset, and one of them was elongated by 10 meters. FIG. 12 provide the results of cooperative receivers for this configuration. Specifically, it shows Horizontal and Vertical error versus the number and type of receivers that are cooperating.

As is shown, for cooperative receivers, the error reduces dramatically as soon as there are two cooperating receivers, and still further for three and four receivers. We also observe that for GPS L5 frequency, the error is reduced even more than for GPS L1 frequency. The additional improvement is due to the higher signal power which increases the SNR at the receiver and also because the Direct Sequence Spread Spectrum L5 chipping rate is ten times higher than for L1. This means the inherent time resolution is also improved, which improves the distance or pseudorange measurements as well.

Figure 13:
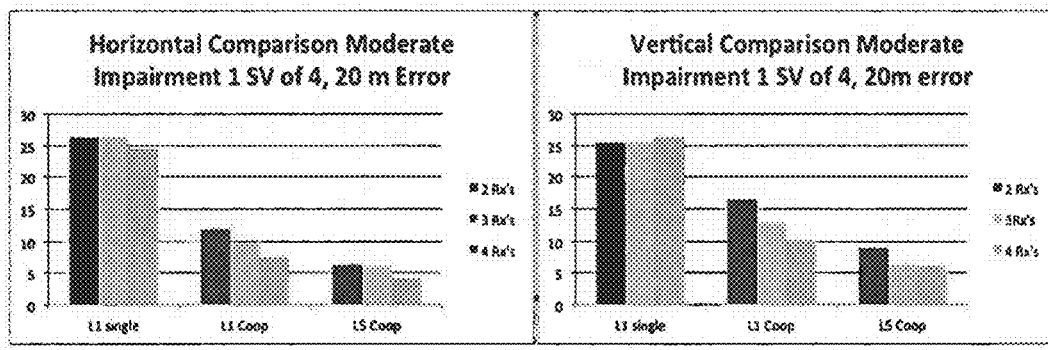
FIG. 13 are graphs of horizontal and vertical error comparison versus the number of receivers in the case where the signals from one of the four visible satellites has a 20 meter error, and showing a non-cooperating situation, and cooperating situations for two different kinds of GNSS signals.

FIG. 13 shows the same analysis but for a different scenario of one SV of the four SVs having a 20 m error and three SVs have the correct correlation response time, with nearly the same result. This is because the GNSS computation engine can remove the erroneous elongated path length.

Next is discussed experimental results for Horizontal error and Vertical error versus Receiver cooperation. A system was set up using four receivers on the second floor of a two story building at four locations (roughly at the corners of the building) using GPS L1 signals only. The computation results are in the table below.

TABLE 1

Empirical results

| | Individual Receiver Horizontal error (m) | Individual Receiver Vertical error (m) | Four Rx cooperation Horizontal error (m) | Four Rx cooperation Vertical error (m) |
| --- | --- | --- | --- | --- |
| Receiver 1 SE | 11.96 | 2.3 | 5.17 | 2.5 |
| Receiver 2 NW | 10.33 | 17.38 | | |
| Receiver 3 SW | 6.2 | 13.6 | | |
| Receiver 4 NE | 4.47 | 8.73 | | |

This shows a net improvement in the average horizontal error from 8.24 meters to 5.17 meters and, for the average vertical error, from 10.5 meters to 2.5 meters.

Figure 14:
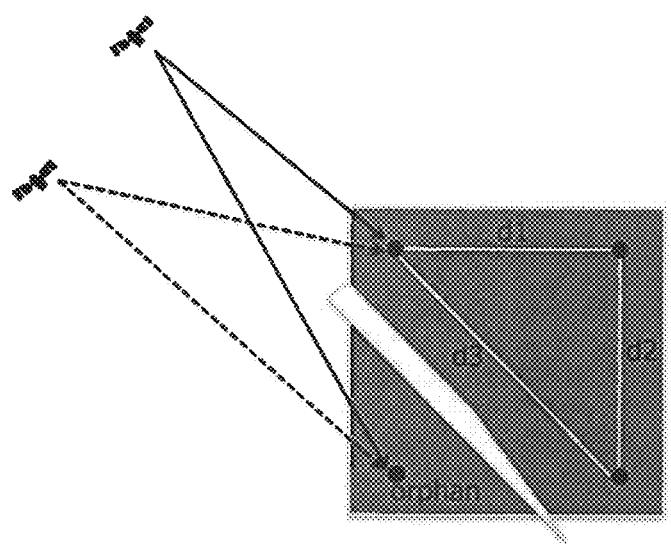
FIG. 14 is an illustration of four receivers, where one of the receivers is an orphan but it and another receiver can see the same two satellites.

There will be cases when the receivers lack the innate ranging capability, or cases where there are sufficient impairments between two receivers such that direct ranging between them is impractical. This will yield an orphan receiver separate from the others in the geometry as seen in FIG. 14. It is possible in these cases that the 'anchor' receiver and another receiver may have enough common view satellites to enable an RTK-like calculation of the baseline vector from the anchor to another receiver. This would allow the local geometry between the receivers to be calculated and the location of the orphan receiver relative to the anchor.

Supposing the anchor position A where known, and that the other receiver receiver's clock were synchronized to that of the anchor's (e.g., via IEEE 1588 v2). If they both observed a satellite $S_i$ then one could measure the difference in pseudoranges $\Delta r_i$ these two receivers and linearize these as:

$$\Delta r_i = \|S_i - A\| - \|S_i - (A + \delta x)\| \approx (S_i - A)/\|S_i - A\| \cdot -\delta x \quad (2)$$

Where $\delta x$ is the baseline vector from the anchor to the other receiver.

Then, by observing many common satellites while having the clocks tightly synchronized, one can obtain an overdetermined set of equations, and hence solve for the unknown baseline vector $\delta x$. Note that the time of measurement of each member $\Delta r_k$ in the sequence of measurements $\{\Delta r_i\}$ is immaterial; indeed these measurements could be spread over days or weeks.

If clocks cannot be synchronized (i.e. there is a bias between a receiver's clock and the master clock), then one can resort to a double differencing technique.

Define $d \cos_i = (S_i - A)/\|S_i - A\|$ i.e. the direction cosine vector to the $i^{th}$ satellite relative to A.

Then the double difference formulation is:

$$\Delta r_i \Delta r_k = (d \cos_i - d \cos_k) \cdot -\delta x \quad (3)$$

The price, of course is that for any given epoch, two common-view satellites must be observable to both receiver R and anchor A.

While the techniques above may be referred to as using a local anchor to assist an orphan receiver, the techniques can be extended to include a remote anchor (e.g., an anchor reference receiver distant from the current building under consideration). In this case, a central reference anchor receiver is placed in a position for excellent view of the satellites in the vicinity, perhaps in the center of a city with the antenna on the roof of a tall building. This single anchor receiver can serve a wide metro area and provide the reference vector to it and its location as above to an orphan receiver. This can be further extended to serve as the anchor to all receivers and, in essence, considers all receivers as orphans.

It is important to note that the general idea of an anchor receiver providing its location and satellite vector information is key to the RTK system in wide deployment for farming. Unlike farming, where centimeter accuracy is required, this implementation only tries to achieve accuracy in the meter range.

While throughout this document the term receiver has been used, it is intended to apply to any device capable of receiving GNSS signals. This may include dedicated GNSS receivers, smart phones, tablets, laptops, smart watches, gaming devices, and most modern consumer electronic devices. For example, in order to receive GNSS signals, it is typically required to have an antenna, a tuner, and a reasonable oscillator. The GNSS location calculations may be performed in the receiver or in some other processing/computing device.

The techniques described herein could apply to determining the location of an anchor receiver, of a centroid, or of any local reference point. In addition, while specific reference has been made to the ENU and WGS84 coordinate systems, the teachings herein could be applied to any other suitable coordinate system.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the disclosure are desired to be protected.

What is claimed is:

1. A method for a GNSS receiver to more accurately determine a position of the GNSS receiver, based in part on signals received from one or more GNSS satellites, comprising:
   determining a distance from a first GNSS receiver to each of one or more other GNSS receivers;
   receiving at least one GNSS signal from one or more GNSS satellites at each of the first GNSS receiver and the one or more other GNSS receivers;
   generating pseudoranges and correlation values associated with the GNSS signals received from the one or more GNSS satellites for each of the first GNSS receiver and the one or more other GNSS receivers;
   collecting the pseudoranges and the correlation values for each of the first GNSS receiver and the one or more other GNSS receivers; and
   generating a solution that provides the position of the first GNSS receiver and an orientation of the first GNSS receiver and the one or more other GNSS receivers based on the pseudoranges, the correlation values, and the determined distance to each of the one or more other GNSS receivers.

2. A method as defined in claim 1, wherein the determining the distance from the first GNSS receiver to each of the one or more other GNSS receivers is performed cooperatively by the first GNSS receiver and the one or more other GNSS receivers.

3. A method as defined in claim 2, wherein the determining the distance from the first GNSS receiver to each of the one or more other GNSS receivers includes RF ranging.

4. A method as defined in claim 1, wherein the determining the distance from the first GNSS receiver to each of the one or more other GNSS receivers allows the relative geometry of the GNSS receivers to be determined.

5. A method as defined in claim 1, further comprising:
   determining which of the GNSS receivers is able to receive GNSS signals with a largest signal strength from a first one of the GNSS satellites.

6. A method as defined in claim 5, further comprising:
   determining which of the GNSS receivers is able to receive GNSS signals with a largest signal strength from a second one of the GNSS satellites.

7. A method as defined in claim 5, further comprising:
   determining the relative geometry of the GNSS receivers based at least in part on which receiver is able to receive GNSS signals with a largest signal strength from a first one of the GNSS satellites.

8. A method as defined in claim 1, further comprising:
   determining the position of each of the one or more other GNSS receivers in addition to the determining the position of the first GNSS receiver.

9. A method as defined in claim 8, wherein the determining of the positions of the group of cooperative GNSS receivers includes determining the distance between each one of the cooperative GNSS receivers in the group and at least a plurality of other ones of the cooperative GNSS receivers in the group.

10. A method as defined in claim 8, wherein the determining the positions of each of the one or more other GNSS receivers further comprises:

selecting an anchor position relative to the first GNSS receiver and the one or more other GNSS receivers;

applying a first rotation hypotheses corresponding to a first hypothesized orientation of the first GNSS receiver and the one or more other GNSS receivers;

determining a first residual error based on the first hypothesized orientation and a calculated location based on the pseudoranges corresponding to the first GNSS receiver and the one or more other GNSS receives;

rotating the rotation hypothesis about an axis extending relative to the first GNSS receiver and the one or more other GNSS receivers to apply a second hypothesized orientation of the first GNSS receiver and the one or more other GNSS receivers;

determining a second residual error based on the second hypothesized orientation and the calculated location based on the pseudoranges corresponding to the first GNSS receiver and the one or more other GNSS receives;

comparing the first residual errors and the second residual error from the respective one of the first hypothesized orientation and the second hypothesized orientation; and selecting one of the first hypothesized orientation and the second hypothesized orientation based upon the comparison to determine which of the first residual error and the second residual error is smallest.

11. A method as defined in claim 10, wherein a plurality residual errors corresponding to a plurality of hypothesized orientations of the first GNSS receiver and the one or more other GNSS receivers about the axis is determined, wherein the comparison is made of the plurality of residual errors from each respective one of the plurality of hypothesized, and the selection is made based on the smallest of the plurality of residual errors.

12. A method as defined in claim 10, wherein a geodetic system is used and the axis extends through the origin of the geodetic system corresponding to an anchor position relative to the first GNSS receiver and the one or more other GNSS receivers.

13. A method as defined in claim 12, wherein the geodetic system is defined relative to a plane tangent to the surface of the Earth at an intersection of a vector from the center of the Earth to the anchor receiver.

14. A method as defined in claim 13, wherein the geodetic system uses an arbitrary vector as a reference.

15. A method as defined in claim 10, wherein the anchor position coincides with a selected one of the first GNSS receiver and the one or more other GNSS receivers.

16. A method as defined in claim 15, wherein the axis passing through the anchor position extends normal to a plane that is tangent to the surface of the Earth at the anchor position.

17. A method as defined in claim 10, wherein the axis extends normal to a plane that is tangent to the surface of the Earth at the anchor position.

18. A method as defined in claim 17, wherein the first GNSS receiver and the one or more other GNSS receivers are disposed within the plane.

* * * * *